United States Patent [19]

Debacker

[11] Patent Number: 5,608,644
[45] Date of Patent: Mar. 4, 1997

[54] METHOD FOR SUPPORTING TEST ROUTINES

[75] Inventor: Andre Debacker, Aalter, Belgium

[73] Assignee: Siemens Aktiengesellschaft, Munich, Germany

[21] Appl. No.: 265,151

[22] Filed: Jun. 24, 1994

[30] Foreign Application Priority Data

Jun. 24, 1993 [DE] Germany ............ 43 21 054.6

[51] Int. Cl.⁶ ............... H04L 12/26; H04L 29/14
[52] U.S. Cl. .............. 364/481; 364/550; 364/580; 364/579; 364/514 B; 395/183.01; 395/183.22
[58] Field of Search ................... 364/481, 550, 364/580, 578, 579, 514 B; 379/27, 29; 395/157, 160, 183.22, 183.01, 200.11; 370/13, 17; 345/10–15

[56] References Cited

U.S. PATENT DOCUMENTS

| | | | |
|---|---|---|---|
| 4,581,493 | 4/1986 | Gazzo et al. | 179/175.2 |
| 4,837,811 | 6/1989 | Butler et al. | 379/96 |
| 4,897,866 | 1/1990 | Majmudar et al. | 379/94 |
| 4,967,190 | 10/1990 | Fujisaki et al. | 340/700 |
| 5,005,197 | 4/1991 | Parsons et al. | 379/21 |
| 5,019,900 | 5/1991 | Clark et al. | 358/86 |
| 5,063,584 | 11/1991 | Lee et al. | 379/29 |
| 5,119,319 | 6/1992 | Tanenbaum | 364/514 |
| 5,195,124 | 3/1993 | Ishioka | 379/27 |
| 5,235,629 | 8/1993 | Butler et al. | 379/21 |
| 5,335,339 | 8/1994 | Maejima et al. | 395/500 |
| 5,410,585 | 4/1995 | Kawaharata | 379/6 |
| 5,416,825 | 5/1995 | Renger et al. | 379/29 |

*Primary Examiner*—Emanuel T. Voeltz
*Assistant Examiner*—Hien Vo
*Attorney, Agent, or Firm*—Hill, Steadman & Simpson

[57] ABSTRACT

In a method for supporting test routines in a communication system, current subscriber line circuit-related data of the port components of the communication system allocated to the testing mode as well as current operating statuses or signalings of the communication system are allocated to subscriber-associated video screen segments and are imaged.

17 Claims, 3 Drawing Sheets

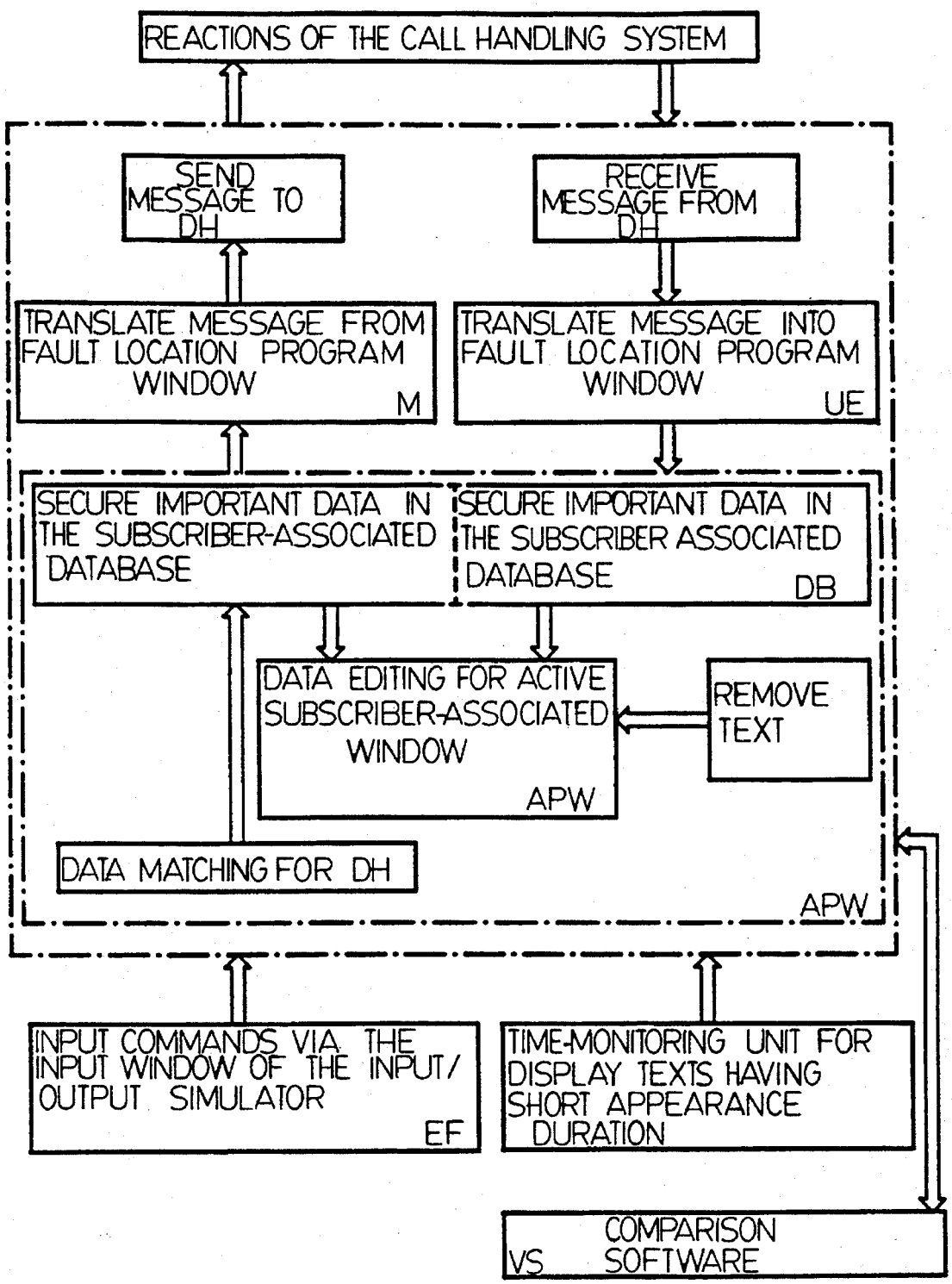

METHOD FOR SUPPORTING TEST ROUTINES

BACKGROUND OF THE INVENTION

The invention is directed to a method for supporting test routines.

After a new system software or new program modules of a system software such as, for example, in an improved version of a system software, administration and maintenance software or software modules effecting additional performance features has or have been integrated into a communication system, the system software is tested overall on the basis of test routines. A determination is thereby made as to whether all the performance and function features characterizing the communication system continue to be available to a user. The test environment of the communication system is simulated in terms of software in order to assure an optimally great flexibility. In this test environment, simple test routines or time-critical switching procedures are initiated by events, for example triggered by subscriber terminal equipment simulated in terms of software. It is thereby extremely difficult for a developer who monitors the testing procedure, for example, at a video screen, to immediately recognize the status of the respective testing phase due to the complexity of program modules that execute the test procedures. Given unanticipated errors in the system software, the developer has test program aids such as, for example, a debug program module available to him for fault isolation. Program errors can thereby only be localized by repeatedly starting a test procedure and by setting break points. A complicating factor for an error search in the program modules of the system software of the communication system is the fact that a test program must be repeatedly started for localizing critical program locations. For example, a simple call setup between two subscribers connected to the communication system produces a multitude of signaling procedures that are exchanged between a data processor and an input/output processor in a machine-oriented language such as, for example, in ASCII characters. Each signaling procedure between the processors causes a plurality of program steps that, displayed on a video screen or a video screen segment, can be duplicated. An error search on the basis of the debug data takes on an extremely complicated form since only a limited number of lines is available for this at a video screen. In addition to the debug program module, a trace program module can be utilized for the error search, the individual instructions of a test program being successively implemented therein and the user can duplicate these instructions program line by program line. "Paging through" the trace data becomes extremely time-consuming given the complex program relationships.

SUMMARY OF THE INVENTION

It is an object of the present invention to provide a method for supporting test procedures that is improved in comparison to the prior art.

This object is achieved by a method for supporting testing procedures in a communication system, whereby configuration data of the communication system or input data triggering a test routine as well as test program routine data are respectively displayed visibly in a segment of a video screen. At least one further video screen segment is produced on the video screen wherein, based on the criterion of program procedures, current subscriber line circuit-related data of the port components of the communication system allocated to the test mode as well as current operating statuses or signalings of the communication system are visually displayed.

The present invention yields the advantage that current, subscriber line circuit-related data of a connection just being tested such as, for example, an acoustic as well as visual signaling is displayed at the participating subscriber terminals and the developer can reduplicate the course of the test and the result of the test at the video screen. An initiated as well as executed call setup between the subscriber terminal equipment in a communication system can be immediately compared to a connection or signaling that has in fact been carried out. Wrong connections or faulty signalings can be immediately recognized and can be corrected in the corresponding program modules of the system software. Over and above this, a respective "actual condition" at the subscriber terminal equipment can be duplicated in, for example, an internal call setup by simply comparing window contents (video screen segments).

A further development of the present invention is that acoustic signaling and, to the extent that it has been implemented, visual signaling such as, for example, the displays of the calling and called subscriber adapted to one another can be respectively imaged in a corresponding window or video screen segment allocated to a subscriber line circuit. This yields the advantage that the collaboration of information that are allocated to a respective subscriber can be checked in a simple way.

A further development of the present invention is that further windows, such as, for example, a test and input window for debug commands, an input window for input commands that trigger simulation procedures, a window having current test program excerpts as well as a window having configuration data of the communication system are displayed on the video screen. This yields the advantage that both triggering events, switching-oriented program segments as well as acoustic and visual information or status information are avoided in repeated test procedure runs or test procedure runs repeated at the telecommunication terminal equipment and system software errors can be immediately recognized and immediately corrected on the basis of this display on the video screen.

A further development of the present invention is that the display information is imaged in the subscriber line circuit-related video screen segments priority-dependent in accord with their urgency. In addition to yielding the advantage that texts having lower priority such as, for example, waiting texts can be viewed and checked, this also yields the further advantage that all texts that were sent to the subscriber terminal equipment are displayed unselected.

A further development of the present invention is that the information imaged in the windows is controlled time-dependent. This yields the advantage that such information is masked out from the data memory and from the video screen after a time interval and further testing procedures are started and space for new display information is also created in the windows.

In an advantageous development of the present invention the display of the current, subscriber line circuit-related data can be controlled priority-related. Subscriber-associated display texts can be reproduced in the video screen segment. A call signaling and tone signaling can be displayed subscriber-associated within the video screen segment. The subscriber statuses "busy", "connected" as well as "released" can be displayed within the video screen segment. The video screen segment is automatically matched to the data to be displayed. The display information can be checked within a time grid. The plurality of video screen segments ensues or can be predetermined dependent on the scope of the call setup. The data displayed in the video screen segments can be evaluated by a further program module.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 depicts a data window regeneration.

DESCRIPTION OF THE PREFERRED EMBODIMENT

Figure 1:
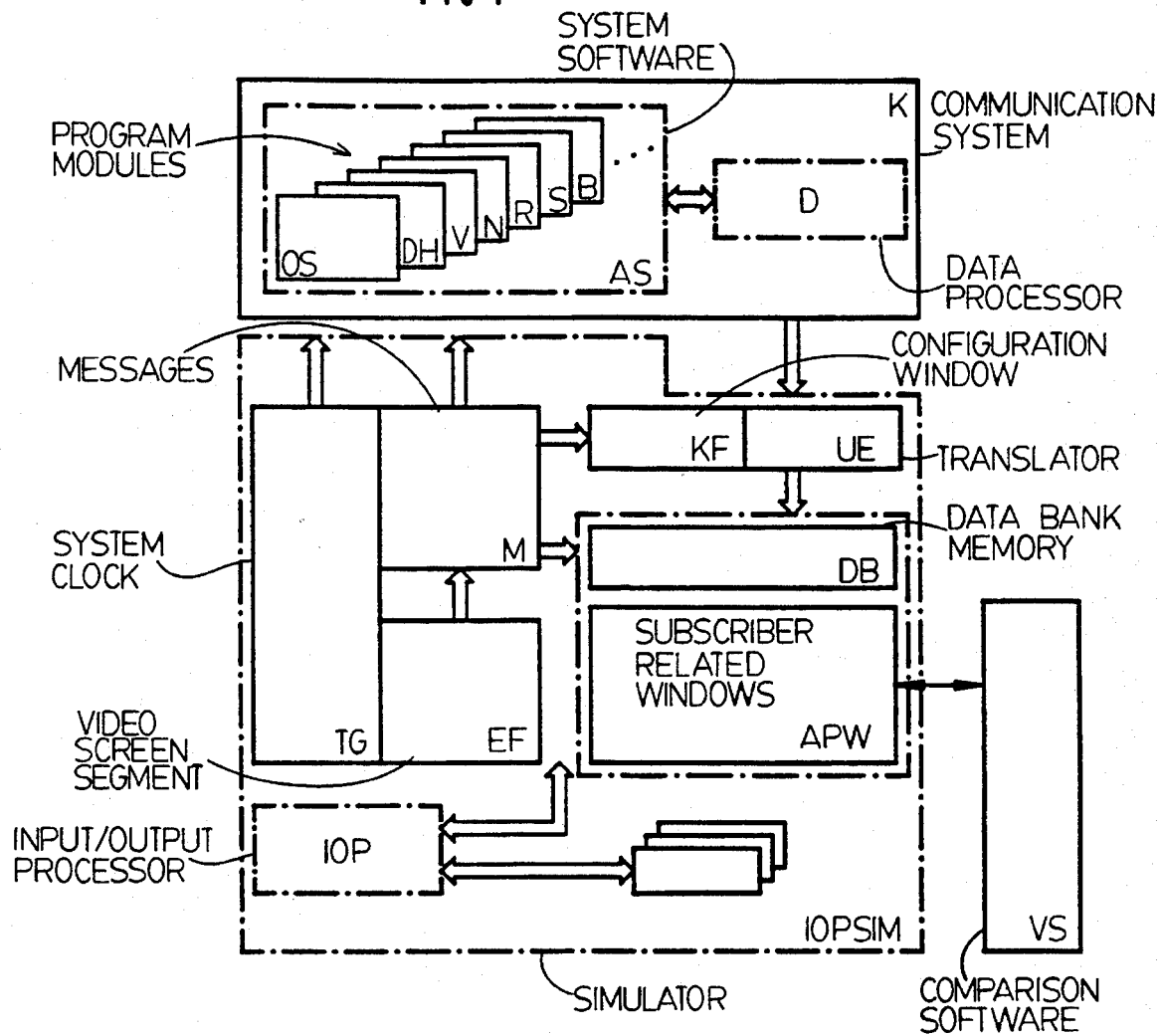
FIG. 1 is a schematic illustration of a system configuration.

FIG. 1 shows a schematic illustration of a test environment for testing a systems software AS of a communication system K. The system software AS to be implemented into the communication system K can be tested either via subscriber terminal equipment connected to a communication system K or via subscriber terminal equipment that is simulated in terms of software. In the following specification, the terminal equipment units of a communication system K are simulated in terms of software by an input/output simulator IOPSIM for testing the system software AS. The test procedures can then be fashioned such that time-critical switching procedures can be intentionally implemented in the communication system K. The entire system software is tested by a data processing system with test procedures that supports the error search in the system software. An error search program (debugger) allows break points to be set dependent on specific conditions such as variable values or memory addresses and also allows the checking of contents of data memories or, for example, the skipping or addition of program parts. The software employed by a data processor for implementing a switching service is composed of a plurality of program modules. The complexity of the system software AS of the communication system is indicated below, whereby the critical program modules OS, DH, B, N, P, R and S are placed in quotations marks:

An "operating system OS" sees, for example, to a correct message traffic according to task priorities or a timer administration.

A "device handler DH" composed of a plurality of device handler types sees to a matching of the messages regardless from which or to which terminal equipment the message comes or goes; let normal or digital telephones, normal interconnections or dialed connections be recited here as examples.

A "switching program V" interprets messages/events and decides about the signaling and the interconnection of subscriber line circuits.

A "network N" software module realizes, for example, the interconnection of subscriber line circuits. With an "administration and maintenance B" software module, for example, a system can be established, for example, by assigning authorizations or the grouping of subscribers.

A software module responsible for a "recovery R" that restarts given the appearance of errors in a system software AS without interrupting existing called connections in the communication system K.

A software module that is responsible for the "dependability systems" within the communication system regularly checks hardware/software parts of the communication system for their availability and dependability.

In order to design a test environment of a communication system as flexibly and transparently as possible, as indicated here in FIG. 1, the messages M to and from the external subscriber terminal equipment connectable to a communication system K are simulated by an input/output simulator IOPSIM. By user actions such as, for example, picking up, dialing or pressing function keys at the communication terminal equipment of the communications system K, messages are forwarded from the input/output processor IOP to the data processor D. In the opposite direction, reactions such as, for example, signaling tones, display info, LED info, is sent back from the data processor D to the input/output processor IOP in the form of messages. The IOPSIM commands can be stored in data banks DP and can be called in and evaluated as often as desired.

The input/output simulator IOPSIM essentially executes the following data management procedures:

Offering a system clock TG for the data processor D of the communication system K. Among other things, the system clock TG is necessary in order to control the "operating system OS" of the data processor D of the communication system K.

The forwarding of input data that is input by a tester via an input window for simulation commands at the video screen segment EF.

The formatting of a configuration window KF from which the developer can see at what plug-in locations assemblies are plugged or where and which terminal equipment are connected. Over and above this, what subscriber terminal equipment and with what displays, such as, for example, 2×24 or 8×40 characters, are employed can also be seen from the configuration window KF.

Processing messages M that are sent from and to the IOP.

Synchronously with the dispatching of messages or, respectively, arrival of the messages M from the "input window" EF, all important hexadecimal values are translated into a plain text to the farthest-reaching extent and are overlaid in the window. The messages that, coming from the IOPSIM, are transmitted to the data processor D and the messages that are transmitted from the data processor D to the IOP via a translator unit UE are respectively checked for data that are involved with a signaling from or to the subscriber terminal equipment. The selected data such as, for example, a current signaling to and from the subscriber terminal equipment, are intermediately stored in the memory DB related to subscriber line circuit. This data related to subscriber can then be visualized in correspondingly initialized, subscriber-related windows APW via designational, manual input commands or via sub-routines during the program modules implementing the test procedures. The critical data displayed within a window is:

Terminal (port/card) and call number AC;

Hand set placed down or picked up SETUP;

Connected calls with rhythm RING;

Connected tones with rhythm TONE;

Connected LED's potentially with a flashing rhythm LLED/RLED;

Visible texts after display VIS; and

Editing text passages that are deposited in the memory DB in order to be displayed priority-dependent and/or time-dependent RDY.

A comparison software VS specifically matched to the testing software compares actual conditions to stored rated conditions.

Figure 2:
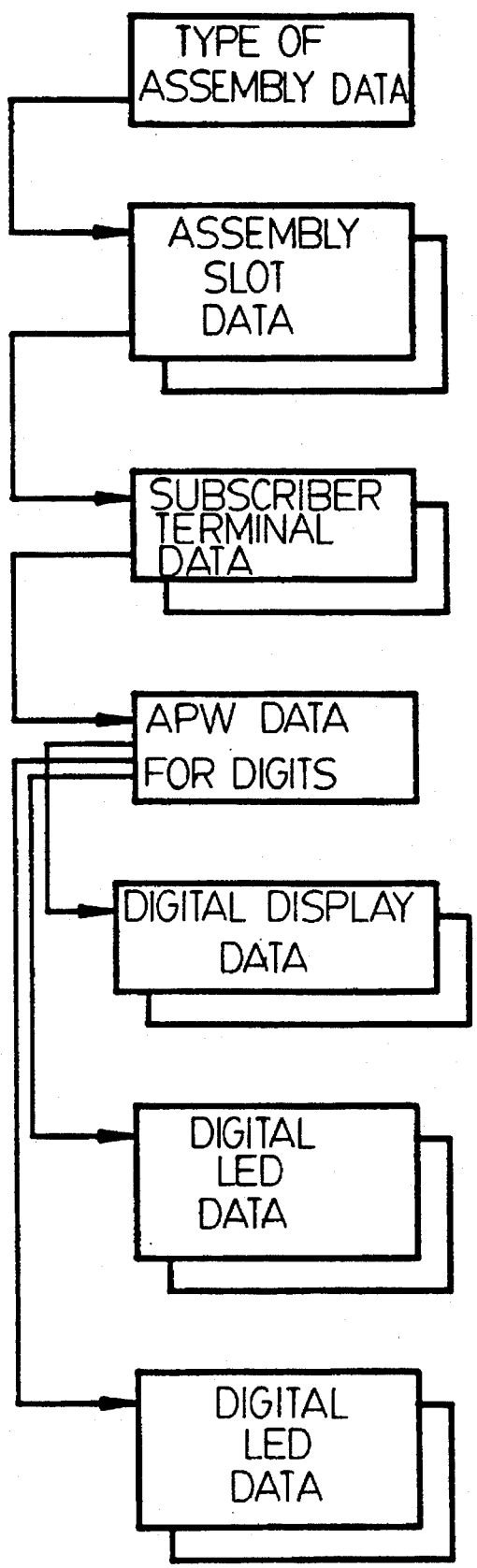
FIG. 2 depicts tables.

FIG. 2 shows a plurality of tables that, respectively selected via addresses, contain subscriber-related information about the communication terminal equipment. Data corresponding to a call setup such as, for example, an internal, external call or the request of a manual switching position are activated by these tables and displayed in the corresponding subscriber-related windows APW. The selection of the tables ensues either directly by the user or within a sub-routine in the test program module. For offering the respective display information, an input/output database DB that is dependent on subscriber line circuit is separately created (see FIG. 1 or FIG. 3). Every time when a card is selected, the card type and further information noted in a plurality of tables such as, for example, in the table for card type info (assembly type data), card slot info (assembly plug-in location data), IDTPORT (port data), IDTWINDI (APW data for digital, IDTDISP (Digital display data), IDTLED (Digital light-emitting diode data) are identified and stored in the memory DB specifically associated to subscriber. The data deposited in the card type info is assembly type name, assembly type value, terminal port per assembly, assembly grouping bit, standard type or the APW window as well as a pointer to an information field for the plugged assembly. The card having the plug-in location data contains a pointer to the next table, assembly plug-in location number as well as pointer to the port data. The table having the port data (IDTPORT) comprises the following data: pointer to the next table, assembly-internal local number, apparatus type value, type of the APW window, status of the APW window, window position number, data flow identification of the APW window and pointer to the stored APW window data. The data stored in the table IDTWINDI is hand set status, call information, tone information, call status, pointer to display data, pointer to the left-hand LED data as well as to the right-hand LED data. The digital display data of the table IDTDISP contain data of the ASCII character chain per priority and field, status per priority, time counter per priority, display command and timer element per priority. The table for the digit light-emitting diode data (IDTLED) contains the following data: pointer to the next table, rhythm, key function number, reference number as well as physical key number. After the conclusion of a connection, the stored data with respect to the connection is again erased. The calculation of a subscriber-specific information shall be set forth in greater detail below with reference to FIG. 3.

FIG. 3 schematically indicates a generation of status data of a subscriber line circuit in a plurality of steps.

Request to display one or more port-related, active windows:

By inputting, for example, a command "APW subscriber line circuit number on/off" in the window EF, the user activates the corresponding subscriber line circuits to display the data stored with respect thereto. The request is retained per subscriber line circuit.

Build-up of the data base:

All messages from/to the input/output simulation processor IOPSIM are offered to the previously activated window APW. The messages M are thereby investigated for their content, whereby the relevant information are converted by sub-routines into data structures necessary for the active window APW (see FIG. 1 or FIG. 2). This data is stored in subscriber-individual memory areas DB. The creation of a subscriber-individual memory area DB is implemented for the total number of subscriber line circuits participating in the testing procedures. For example, the following data is stored in this subscriber-individually created memory area DB.

For a normal telephone (NOFE):
  Handset status;
  Call status;
  Tone;
  Grounding key; and
  Signal lamp status.
For a trunk circuit:
  Call;
  Tone;
  Grounding the line;
  Reversing polarity of the line;
  LED (on the assembly).
For ISDN apparatus:
  Call reference number;
  Service identification;
  Message type.
For digital interfaces to the data communication traffic (DCI):
  Calling (setup/connect);
  Call;
  Text.
and for a digital telephone:
  Calling (setup/connect);
  Call;
  Tone;
  LED info/Key identification, LED info/Key number, LED info/Rhythm; and
  Display info/Text per priority and per field (for example two digital telephone types are supported, digital telephone with display for a 2×24 character sequence 12 priorities and 4 fields, digital telephone with display for an 8×40 character sequence 2 priorities and 22 fields), Display Info/Status per priority (most important statuses, deleted, ready and visual) Display Info/Time info per priority (command time). Some texts are only temporary stored by the time command.

The stored data deposited subscriber-associated can be overlaid in the windows APW during a testing procedure.

After every message, whereby data was deposited in a subscriber-associated data base DB, a check is carried out to see whether the subscriber line circuit (port) is marked for a display. When this is not the case, a display with respect to a port is aborted. If this port is marked, then an investigation is made under program control to see whether the appertaining subscriber line circuit has already been assigned a window APW. When this is not the case, a window APW is opened up for this subscriber line circuit. A program module sees to it that the windows APW are positioned next to one another and are preferably positioned in the lower video screen region and are overlaid. Another type of user-associated positioning of the windows APW on the video screen is likewise possible.

The stored subscriber line circuit-related data is formatted line-by-line and overlaid in the window APW. The display information is allocated to a line dependent on the field number thereof. Additional information about the appertaining subscriber information is taken from the tables (see FIG. 2). The stored information thereby contains, for example, the plurality of display fields, the width of the display field or a notation of the display information aligned to the left or right edge of the field. Before the data is written into the window APW, another check is carried out to determine if the data to be displayed can be written into the configured window APW or whether the coordinates for the window APW are also to be additionally adapted.

Texts to be displayed time-dependently are displayed within the time factor assigned to them. The program instruction required for this purpose is stored subscriber-associated in the data base DB. A separate task is initiated relating to the time-dependency of the subscriber-associated information deposited in the data base DB, this separate task in turn removing the time-dependent texts from the data base DB after a predeterminable time. A text imaged in the window is then blanked out of the window and a space that becomes free can be newly written.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for supporting testing procedures in a communication system having terminal equipment units connected thereto, at least one of configuration data of the communication system and input data that triggers a test routine and that triggers test program routine data being displayed visibly in a video screen segment of a video screen, comprising the steps of:

acquiring, for testing system software of the communication system, by an input/output simulator unit all of said configuration data of the communication system;

simulating all terminal equipment units, that are connected to the communication system, by the input/output simulator unit;

producing at least one further video screen segment on the video screen; and based on a criterion of program procedures, visually displaying in the at least one further video screen at least one of current subscriber line circuit-related data of port components of the communication system allocated to a test mode and current operating statuses or signalings of the communication system.

2. The method according to claim 1, wherein the display of the current subscriber line circuit-related data is displayed according to priorities of the circuit-related data.

3. The method according to claim 1, wherein subscriber-associated display texts are produced in the at least one further video screen segment.

4. The method according to claim 1, wherein call signaling and tone signaling are displayed subscriber-associated within the at least one further video screen segment.

5. The method according to claim 1, wherein at least one of the subscriber statuses "busy" "connected" and "released" are displayed within the at least one further video screen segment.

6. The method according to claim 1, wherein the at least one further video screen segment is automatically matched to data to be displayed.

7. The method according to claim 1, wherein display information of the at least one further video screen is checked within a time grid.

8. The method according to claim 1, wherein a plurality of video screen segments are produced dependent on a scope of a call setup.

9. The method according to claim 1, wherein the data displayed in the at least one further video screen segment is evaluated by a further program module.

10. A method for supporting testing procedures in a communication system, at least one of configuration data of the communication system and input data that triggers a test routine and that triggers test program routine data being displayed visibly in a video screen segment of a video screen, comprising the steps of: producing at least one further video screen segment on the video screen; and visually displaying in the at least one further video screen current subscriber line circuit-related data of port components of the communication system allocated to a test mode and current signaling of both calling subscriber and a called subscriber, the display of the current subscriber line circuit-related data being displayed according to priorities of the circuit-related data, and the at least one further video screen being automatically matched to data to be displayed.

11. The method according to claim 10, wherein display information of the at least one further video screen is checked within a time grid.

12. The method according to claim 10, wherein a plurality of video screen segments are produced dependent on a scope of a call setup.

13. The method according to claim 10, wherein the data displayed in the at least one further video screen segment is evaluated by a further program module.

14. A method for supporting testing procedures in a communication system, at least one of configuration data of the communication system and input data that triggers a test routine and that triggers test program routine data being displayed visibly in a video screen segment of a video screen, comprising the steps of: producing at least one further video screen segment on the video screen; and visually displaying in the at least one further video screen at least one of subscriber-associated display texts, call signaling, tone signaling subscriber status "busy", subscriber status "connected" and subscriber status "released", and the at least one further video screen being automatically matched to data to be displayed.

15. The method according to claim 14, wherein display information of the at least one further video screen is checked within a time grid.

16. The method according to claim 14, wherein a plurality of video screen segments are produced dependent on a scope of a call setup.

17. The method according to claim 14, wherein the data displayed in the at least one further video screen segment is evaluated by a further program module.

* * * * *